United States Patent [19]
Prudente

[11] 3,746,373
[45] July 17, 1973

[54] CONNECTOR FOR ELECTRICAL CONDUITS

[76] Inventor: Anthony G. Prudente, 213 Queen Ann Road, Bogota, N.J.

[22] Filed: May 25, 1970

[21] Appl. No.: 39,975

[52] U.S. Cl.................. 285/162, 285/319, 339/128
[51] Int. Cl............................................. H02g 3/08
[58] Field of Search................... 285/158, 162, 319; 339/126, 128

[56] References Cited
UNITED STATES PATENTS

| | | | |
|---|---|---|---|
| 2,466,504 | 4/1949 | Stoyer | 285/162 |
| 2,823,932 | 2/1958 | Schigut | 285/162 |
| 2,508,476 | 5/1950 | Stecher | 285/162 |
| 2,577,748 | 12/1951 | Gillespie | 285/162 |
| 2,973,212 | 2/1961 | Rose | 285/162 X |
| 3,183,297 | 5/1965 | Curtiss | 285/162 X |
| 3,409,858 | 11/1968 | Krehbiel | 285/319 X |

FOREIGN PATENTS OR APPLICATIONS 540,137   4/1957   Canada............................. 285/162

*Primary Examiner*—J. Karl Bell
*Attorney*—John J. Lipari

[57] ABSTRACT

A connector capable of being quickly connected to a cable or conduit which then may be easily secured within the opening of a conduit box. The connector includes a sleeve body having an entrance opening at one end for receiving the conduit and means located at the other end of the sleeve body for engaging the conduit end and applying an axial force onto said conduit end. Resilient means project from the external surface of the sleeve body for engaging the inner surface of the conduit box opening to secure the connector thereto.

10 Claims, 4 Drawing Figures

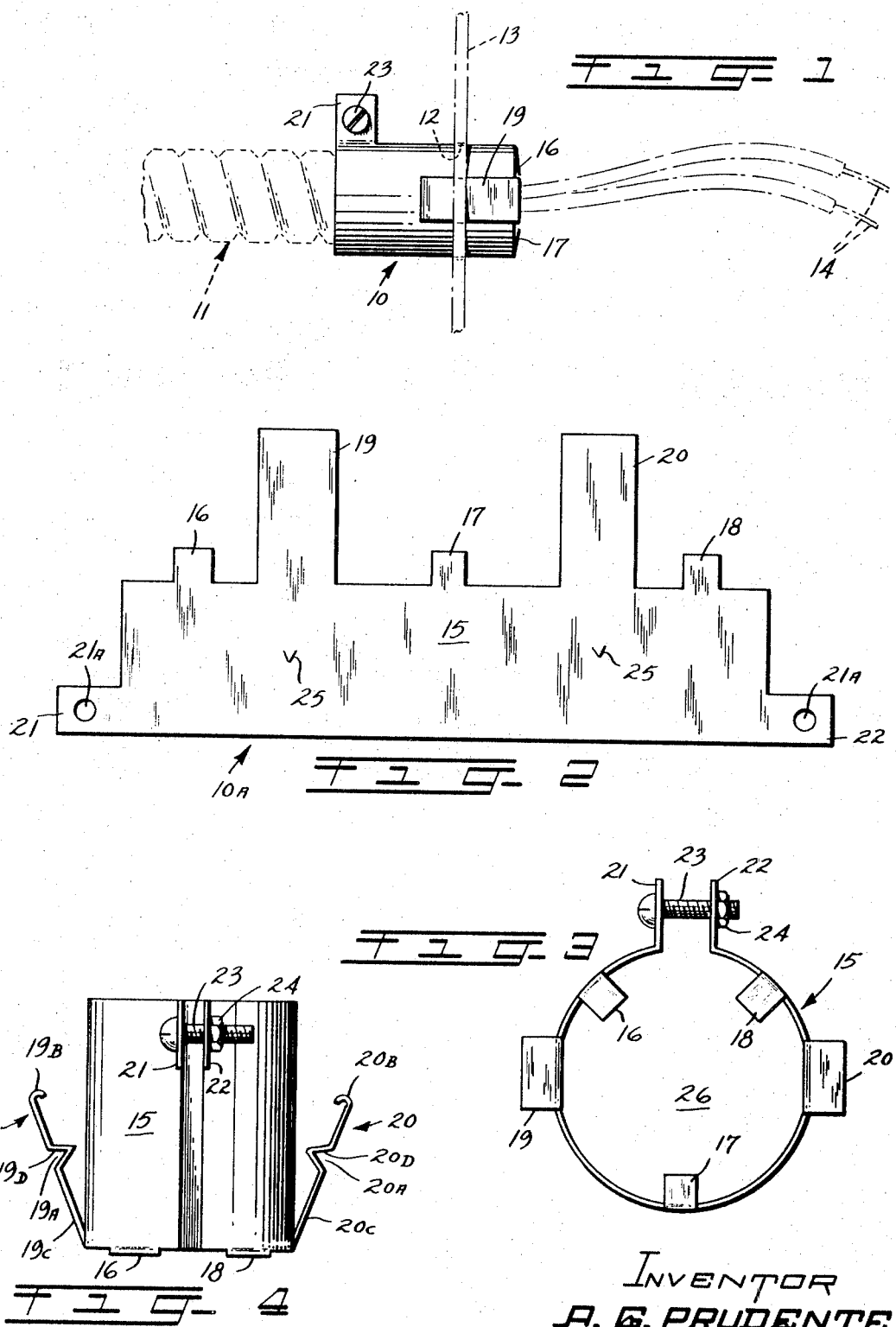

CONNECTOR FOR ELECTRICAL CONDUITS

BACKGROUND OF THE INVENTION

Numerous connectors have been devised for attaching conduits, cables, etc., hereinafter referred to as "conduit", to the openings of conduit receptacle boxes. Such prior art connectors generally consist of multiple components and include a male threaded member which is passed through the front end of the conduit box opening, a nut for threadedly connecting the male member to the back end of and within the conduit box, a floating member located at the front end of the male member for grasping the conduit passing therethrough and a pair of screws and nuts for securing the floating member to the conduit.

It is apparent with such prior art connectors that the manufacture thereof is costly and the labor consumption of time required, when utilizing said connectors for connecting conduits to conduit box receptacles, is quite high. Further, numerous cutting injuries have occurred to individuals working with said connectors, particularly when inserting their fingers within the conduit box to tighten the nuts to the threaded male members.

SUMMARY

It is an object of this invention to obviate the difficulties associated with prior art connectors and to provide a connector which is economical to fabricate and quick to install without injury to the user thereof.

Broadly, the inventive connector is capable of being quickly connected to a conduit and secured within the opening of a conduit box. The connector includes a sleeve body having an entrance opening at one end for receiving the conduit and means located at the other end of the sleeve body for engaging the conduit end and applying an axial force onto said conduit end.

BRIEF DESCRIPTION OF THE DRAWINGS

FIG. 1 depicts a formed connector attached to a conduit and installed in a conduit box;

FIG. 2 is a punched blank which is used for forming the connector;

FIG. 3 is an end view of the connector in its open position ready to receive a conduit; and, FIG. 4 is a plan view of the connector in its closed position for securing a conduit (not shown).

DESCRIPTION OF THE PREFERRED EMBODIMENT

The present invention, as seen in FIG. 1, contemplates a connector 10 which is capable of being quickly attached to an electrical conduit 11, such as BX cable, and then quickly and fixedly inserted within a slot opening 12 of a conventional conduit receptacle 13, whereupon the conductors 14—14 of the conduit may then be connected to desired circuits (not shown).

As seen in FIG. 2, the connector 10 is formed from a punched blank 10a which is of a suitable material, such as a spring-type steel. The blank 10a includes a sleeve body 15 which, when rolled, as seen in FIGS. 1, 3 and 4 will be of annular configuration and adaptable for fitting about conduit 11. Extending from sleeve body 15 are three nibs 16, 17 and 18 which, as seen in FIGS. 1 and 3, when bent upwardly form a 90° angle with the flat blank 10a to serve not only as stops for the end of the conduit but also to provide an axial force upon said conduit end when securing the connector thereto.

As seen in FIG. 2, a pair of projecting members 19,20 extend between nibs 16, 17 and 17, 18 respectively. Members 19,20 each are bent downwardly approximately 160° and, as seen in FIG. 4, are normally located at about a 20° angle with the external surface of sleeve 15 in the form of resilient pinchers, said pinchers being in diametric opposing relationship with each other. Each of pinchers 19,20 are provided with respective V-shaped recesses 19a,20a for engaging the inner surface of slot opening 12 to lock the connector to the conduit receptacle box, as described in detail hereinafter. Pincher ends 19b,20b are bent over to provide a rounded smooth surface for preventing injury to one working with the connector.

Sleeve body 15 also is provided with tabs 21,22 having respective openings 21a,22a therein. Then the sleeve body is rolled to its annular configuration, as seen in FIG. 3, the tabs are in juxtaposition and openings 21a,22a are in axial alignment for receiving a screw 23 and nut 24 for fastening connector 10 to conduit 11. As seen in FIG. 2, optionally, sleeve body 15 also is pierced at points 25—25 located along the central axis of pinchers 19,20, the metallic pierced points serving to slightly puncture the BX cable during a fastening of the connector to the conduit, thereby providing a firm hold of the connector therewith. Obviously, the pierced points 25—25 are sufficiently short in length to insure that the conductor insulation of the conductors are not punctured.

As seen in FIG. 3, connector 10 is in its formed condition for use and comprises nibs 16,17 and 18 bent upwardly at about a 90° angle; projecting members 19,20 are bent downwardly at about a 160° angle in the form of resilient pinchers; sleeve body 15 is rolled to an annular configuration; screw 23 is passed through tab openings 21a,22a and nut 24 is threadedly connected to the screw end. It can be seen that nib 17 is located at the bottom of the connector while nibs 16 and 18 are respectively located at the upper left portion and upper right portion of the connector. As such, nib 17 forms about a 135° angle with nib 18 on the right side of the connector and, similarly, nib 17 forms about a 135° angle on the left side of the connector. It also can be seen that pinchers 19,20 project along opposing midlateral surfaces of sleeve 15.

In operation, conductors 14—14 are inserted through conductor sleeve opening 26, the connector then being manually moved towards the conduit end. As the connector reaches the conduit end, the inner surfaces of nibs 16,17 and 18 strike a previously inserted conventional dielectric stop (not shown), in the form of a washer, located at the conduit end, said nibs applying an axial force onto the conduit. Nut 24 is tightened onto screw 23 to securely fasten the connector to the conduit and, simultaneously, pierced points 25—25 pierce into and grasp the conduit.

Once the connector is fastened to the conduit, conductors 14—14 are passed through slot opening 12 of conduit receptacle 13 and the connector is partially passed through said slot opening which is just slightly larger in diameter than the diameter of the connector. As the connector passes through opening 12, pincher surfaces 19c,20c slide along the inner surface thereof and, in so doing, pinchers 19,20 are depressed until the V-shaped recesses make contact with the inner surface of the slot opening, thereby causing the pinchers to spring outwardly and firmly hold the connector to the box.

Preferably, the V-shaped recesses are of about 45° angles and arranged such that surfaces 19d,20d are flush against the external surface of the conduit box to prevent any further forward movement of the connector. It is to be understood, however, that V-shaped recesses can be of any desired angle, e.g., 30° to 60° and of a sufficient depth for contact with various size conduit boxes.

In the event it is desired to remove the conduit from the conduit receptacle box 13, conductors 14—14 are disconnected from the circuit and, pinchers 19,20 are easily depressed or squeezed together to disengage the V-shaped recesses 19a,20a from the inner surface of slot opening 12, whereupon the connector and conduit are then withdrawn, all quite quickly and simply.

While a particular preferred embodiment has been described, this invention may take various forms. For example, blank 10a may be punched with the nibs and pinchers being bent simultaneously. Also, either a single circumferential crimped nib or a plurality of successive 45° angular nibs can be punched and then bent at 90° angles in lieu of the three nibs 16,17 and 18 described, for serving as the conduit stop and for applying the desired axial force to the conduit end. Further, while the connector has been described for use with BX conduit, it can also be used with other type conduits. Accordingly, it is to be understood that other embodiments and modifications are possible without departing from the spirit and scope of this invention.

I claim:

1. A connector capable of being either quickly connected to a conduit box opening or quickly disconnected therefrom (and secured within the opening of a conduit box), which comprises:

a sleeve body having an entrance opening at one end for receiving the conduit, means located at the other end of the sleeve body for engaging the conduit end and applying an axial force onto said conduit end, means for securing the connector to the conduit, and resilient means projecting from the external surface of the sleeve body for engaging the inner surface of the conduit box opening to secure the connector thereto, said resilient means including at least one member having a substantially V-shaped recess located therein, said member projecting from the external surface of the sleeve body such that it is depressed during sliding contact with the inner surface of the conduit box opening until the V-shaped recess engages said inner surface of the conduit box opening, whereupon said member springs outwardly to lock the connector within said opening.

2. A connector according to claim 1 wherein the resilient means includes:

another member structurally similar to said first defined one member and located in diametric opposing relationship therewith on the sleeve body.

3. A connector according to claim 2 wherein the V-shaped recess is provided with an angle ranging from 30° to 60°.

4. A connector according to claim 3 wherein the V-shaped recess is provided with a 45° angle and one surface of said recess is capable of being flush with the external surface of the conduit box.

5. A connector according to claim 4 wherein the resilient member is provided with a rounded smooth free end.

6. A connector capable of being either quickly connected to a conduit box opening or quickly disconnected therefrom (and secured within the opening of a conduit box), which comprises:

a split sleeve body having an entrance opening at one end for receiving the conduit, means located at the other end of the sleeve body for engaging the conduit end and applying an axial force onto said conduit end, tabular means extending from the sleeve body, locking means cooperatively associated with the tabular means for securing the connector to the conduit, and a pair of resilient projecting members located in diametrically opposed relationship and projecting from one portion of the sleeve body, each of said members having a substantially V-shaped recess located therein and projecting from the sleeve body such that said members are depressed during sliding contact with the inner surface of the conduit box opening until the respective V-shaped recesses engage said inner surface of the conduit box opening, whereupon said members spring outwardly to lock the connector within said opening.

7. A connector according to claim 6 wherein the engaging means applying said axial force onto the conduit includes:

a plurality of radially extending nibs projecting at 90° angles with the internal surface of the sleeve body.

8. A connector according to claim 7 wherein said plurality of nibs includes:

a first nib located at the bottom end of the connector, and second and third nibs located in the upper right and left portions of the connector, said first nib forming about 135° angles with the second and third nibs, respectively.

9. A connector according to claim 8 wherein said V-shaped recesses of the resilient projecting members are provided with an angular range of 30° to 60°.

10. A connector according to claim 9 wherein the internal surface of the sleeve body is provided with pierced projecting elements for puncturing the conduit to facilitate a grasping of the connector to the conduit.

* * * * *